Dec. 17, 1929.  H. T. HALLOWELL  1,739,589
PLATFORM TRUCK
Filed April 9, 1927
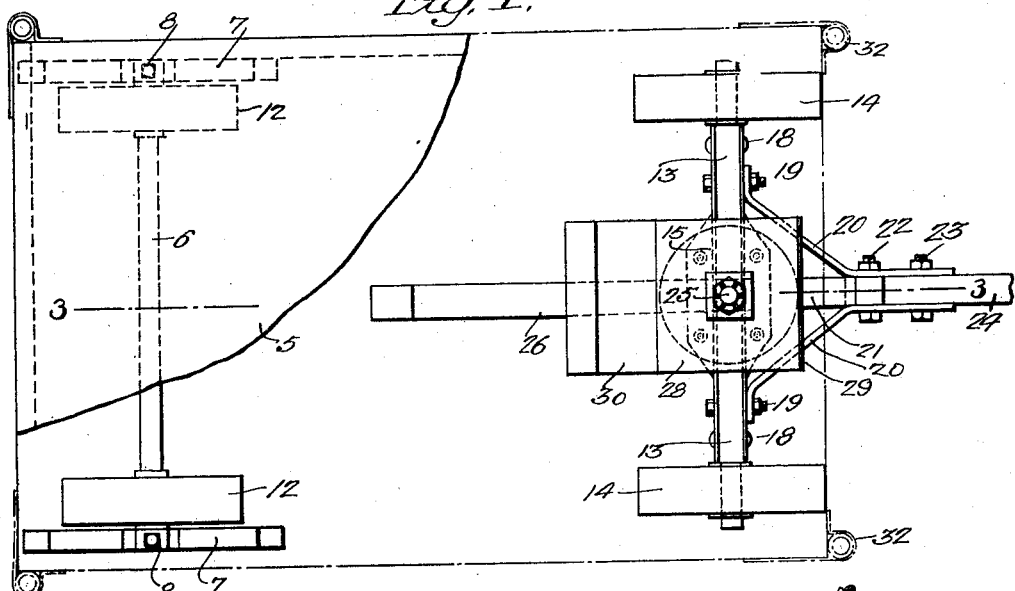
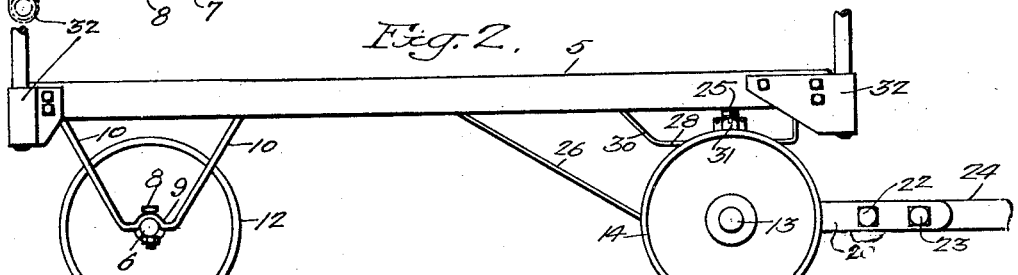
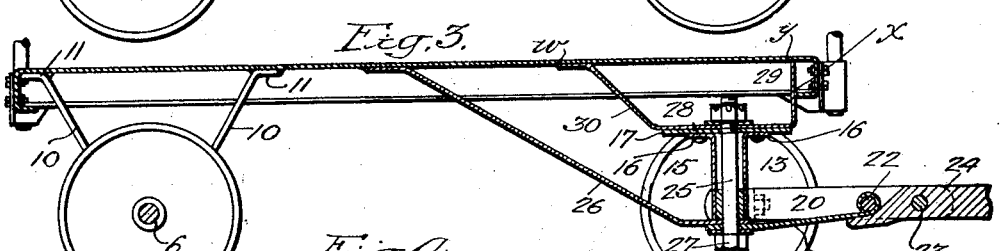
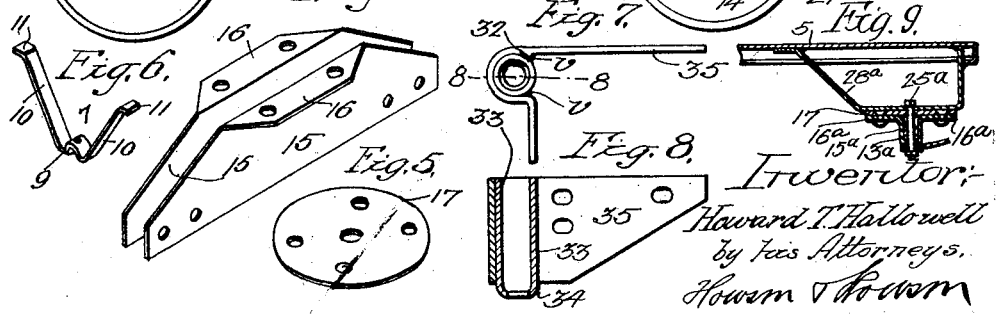

Patented Dec. 17, 1929

1,739,589

UNITED STATES PATENT OFFICE

HOWARD T. HALLOWELL, OF JENKINTOWN, PENNSYLVANIA, ASSIGNOR TO STANDARD PRESSED STEEL COMPANY, OF JENKINTOWN, PENNSYLVANIA, A CORPORATION OF PENNSYLVANIA

PLATFORM TRUCK

Application filed April 9, 1927. Serial No. 182,374.

My invention relates to certain improvements in platform trucks of the type in which the front wheels are mounted on an axle swiveled to the body of the truck.

The object of the invention is to simplify the construction of the truck, and to make the parts of pressed sheet metal.

The invention relates also to certain details described hereinafter.

In the accompanying drawings:

Fig. 1 is a plan view, partly in section, illustrating my improved platform truck;

Fig. 2 is a side view;

Fig. 3 is a longitudinal sectional view on the line 3—3, Fig. 1;

Figs. 4 and 5 are detached perspective views of the fifth wheel swivel which is attached to the front axle;

Fig. 6 is a perspective view of one of the bearings for the rear axle;

Fig. 7 is a plan view of a stake-pocket;

Fig. 8 is a sectional view of the stake-pocket on the line 8—8, Fig. 7; and

Fig. 9 is a modification of the pivot of the front axle.

The platform 5 is made of sheet metal, and is flanged at the sides and ends as shown in Fig. 3. The flanges are preferably inturned as shown, forming very substantial reinforcing edges for the body of the platform. This construction is fully set forth and claimed in a companion application filed April 9, 1927, under Serial No. 182,373.

At the rear of the truck is an axle 6 secured to bearings 7 by bolts 8 in the present instance. Mounted on the axle 6 are the rear wheels 12 of the truck. Each bearing is bent from a flat bar. The portion 9 of each bearing 7 conforms to the shape of the axle, which in the present instance is round. Each of the bolts 8 extends through the portion 9 and through the axle 6 and has a nut thereon which firmly holds the axle in the bearing.

The portions 10 of the bearings are inclined and terminate in pads 11 which are welded or otherwise secured to the body of the platform, and, if desired, the inclined portions 10 may be secured to the flanges of the platform by welding.

The body of the front axle 13 is rectangular in cross-section. The ends are round to form journals for the wheels 14 which may be of any suitable type. Secured to the body of the axle 13 are two plates 15, Fig. 4, which are flanged at their upper edges as at 16, and a fifth wheel plate 17 is secured to the flanges by rivets or other securing means.

The two plates are secured to the axle by rivets 18 and by bolts 19, which also pass through braces 20 located on each side of a tongue 21. A bolt 22 attaches the braces 20 to the tongue, and a bolt 23 forms a pivot for a handle 24. This handle has a portion extending under the tongue as shown in Fig. 3, and holds the handle off of the floor. The handle, however, can be turned up so as to rest against the front edge of the platform when not in use.

The tongue is located on the pivot pin 25 between a lower brace 26 and the head 27 of the pin. The lower brace extends at an angle to the underside of the platform, to which it is secured by welding.

The pivot pin 25 extends at its upper end through a wide plate 28, which forms the upper bearing for the pin and also forms the bearing for the fifth wheel plate 17.

The plate 28 has a vertical portion 29 which is welded to the forward flange of the platform at $x$ and to the body of the platform at $y$. The rear portion 30 of the plate extends rearwardly at an angle and is welded to the body of the platform at $w$.

On the pivot pin are washers and a nut 31. This construction of the pivot or fifth wheel of the forward truck is made from pressed sheet metal, and is substantial and comparatively light.

Stake pockets 32 are located at the corners of the platform in the present instance, and are preferably made as shown in Figs. 7 and 8.

Each pocket is formed of a section 33 of tubing which is turned in at its lower end to form an inturned flange 34, which forms an abutment for a stake.

The tubular section is secured by welding at $v$—$v$ to a plate 35 bent around the tube as shown in Fig. 7, the ends of the plate extending at right angles to each other and being secured to the corners of the platform by bolts or other fastenings.

In Fig. 9 is shown a modification of the pivot of the front axle, the axle 13ª being secured to a fifth wheel plate 17 by a flanged plate 15ª which is bent to receive the axle and to form a flange 16ª to which the plate 17 is secured. The plate 28ª is shaped similarly to the plate 28, Fig. 3, and is welded to the platform in the same manner. A short pivot pin 25ª is used in this instance.

I claim:—

1. The combination in a platform truck, of a platform; a plate located under the forward end of the platform and secured thereto; a brace secured to the platform and extending under the plate; an axle; two flanged plates secured to the axle; a fifth wheel plate secured to the two axle plates, said axle plates and the fifth wheel plate being located between the platform plate and the brace; and a pivot pin carried by the first mentioned plate and brace and extending through the axle and between the axle plates.

2. The combination in a platform truck, of a platform having a flange; a plate located under the forward end of the truck and forming a pivot bearing, said plate having an upright portion welded to the platform and an inclined rear portion welded to the platform; an axle; two plates secured to the axle and flanged at their upper ends; a fifth wheel plate secured to the flanges of the axle plates; an inclined brace located under the axle and secured to the body of the truck; and a pivot pin extending through the brace, axle, fifth wheel plate and bearing plate.

3. The combination in a platform truck, of a platform having a flange; a plate located under the forward end of the truck and forming a pivot bearing, said plate having an upright portion welded to the platform and an inclined rear portion welded to the platform; an axle; two plates secured to the axle and flanged at their upper ends; a fifth wheel plate secured to the flanges of the axle plates; an inclined brace located under the axle and secured to the body of the truck; a pivot pin extending through the brace, axle, fifth wheel plate and bearing plate; a tongue mounted on the pivot pin; braces attached to the axle and to the tongue; and a handle secured to the braces.

HOWARD T. HALLOWELL.